United States Patent [19]
Havens

[11] Patent Number: 5,881,144
[45] Date of Patent: Mar. 9, 1999

[54] GRAPHICAL INTELLIGENT NETWORK (IN) SUBSCRIPTION MANAGER

[75] Inventor: Eric Havens, Prosper, Tex.

[73] Assignee: Ericsson Inc., Research Triangle Park, N.C.

[21] Appl. No.: 785,853

[22] Filed: Jan. 21, 1997

[51] Int. Cl.[6] ....................................................... H04M 3/42
[52] U.S. Cl. ........................................... 379/203; 379/201
[58] Field of Search .................................... 379/201, 202, 379/203, 204, 265, 309

[56] References Cited

FOREIGN PATENT DOCUMENTS

WO 95/29564  11/1995  WIPO.

OTHER PUBLICATIONS

Genette, M., et al.: "Intelligen Network: The Service Creation Environment" Jan. 1, 1995, pp. 13–20.

Ku, B.S.: "A Reuse–Driven Service Creation Environment For The Advanced Intelligent Network" May 1, 1994, pp. 263–267.

Abramowski S., et al.: "Concepts For Service Management By End Users" Nov. 29, 1993, pp. 867–871.

Uchida, Naoki, et al.: Customer–Defined Service Model And Definition Method For Intelligent Networks Jun. 23, 1991, pp. 954–958.

*Primary Examiner*—Robert B. Harrell
*Assistant Examiner*—David M. Ovedovitz
*Attorney, Agent, or Firm*—Jenkens & Gilchrist

[57] ABSTRACT

An application module associated with a Graphical User Interface retrieves data representing a particular Intelligent Network (IN) subscription from a Service Management Application System (SMAS). The application module thereafter interprets the retrieved subscription data by simulating the Service Script Logics (SSLs) residing within the serving Service Control Point (SCP). Relevant SSLs associated with the retrieved subscription data are identified and their relationship and hierarchy determined. The application module then displays the identified SSLs and their relationship using a graphical representation. A service provider or user is able to modify the graphical representation to make changes to the corresponding is subscription data to provide a different IN subscriber service.

20 Claims, 7 Drawing Sheets

GRAPHICAL INTELLIGENT NETWORK (IN) SUBSCRIPTION MANAGER

BACKGROUND OF THE INVENTION

1. Technical Field of the Invention

The present invention relates to a telecommunications system for providing subscriber features and, in particular, to the illustration and/or modification of intelligent network (IN) subscription using a graphical manager.

2. Description of Related Art

As stored program-controlled (SPC) switching systems have evolved, a wide variety of useful features have been developed to extend the communication capabilities such systems provide. Such services or features include call forwarding, "800" or toll free services, call screening, etc. Initially, all hardware and software modules required for providing a particular subscriber feature were placed and executed within a particular telecommunications exchange serving the service requesting subscriber terminal. As a result, each time a new subscriber feature or service was introduced, each and every one of the associated telecommunications exchanges inconveniently and inefficiently needed to be serviced and updated to support the service.

With the development and improvement of sophisticated telecommunications applications, the telecommunications industry has adopted the term "intelligent network" (IN) to denote a concept and architecture for providing vendor-independent and network-independent interfaces between the service logic and the transmission and switching system of a multi-enterprise telecommunications network. The goals of the IN are to centralize the service execution in a control node within a telecommunications network in order to provide rapid definition, testing and introduction of new services as well as the modification of existing services. IN also provides greater flexibility in the design and development of new services in a multi-vendor environment with shorter lead time, and standard network interfaces.

The basic concept behind IN is to move the "intelligence" out of each local exchange or Service Switching Point (SSP) and centralize the services providing the intelligence in a Service Control Point (SCP). By utilizing different combinations of basic building blocks, known as Service Independent Blocks (SIBs), a number of different Service Script Logics (SSLs) can be conveniently created. A specific IN service is then further developed and provided to telecommunications subscribers by utilizing (i.e., linking) one or more of the SSLs. As a result, utilizing subscription data associated with a particular subscriber, a number of SSLs are sequentially executed to provide the desired IN service.

Even with the centralization of IN services and subscription data within an associated SCP, reviewing and modifying IN subscription data associated with a particular subscriber within the existing IN system is still inconvenient and cumbersome. Subscription data are formatted in computer and/or application readable format and are difficult to read and understand. Furthermore each SSL incorporating the relevant subscription data only knows the identity of the next SSL that needs to be invoked. During run-time, each SSL executes the associated SIBs and then passes the control over to the next known SSL. Because the linked SSLs are executed in a chain-link-list fashion, where each SSL only knows the identity of the next SSL, it is difficult to obtain an overview of all of the associated SSLs. Unless a linking of all of the associated SSLs is manually performed, a service provider is unable to illustrate the association of a plurality of SSLs in a more readable and user-friendly format. Manual linking is tedious and inefficient. Moreover, since interpreting subscription data and their associated SSLs is difficult, making changes to the existing IN services and subscription data is further error-prone and time consuming. Accordingly, there is a need for a mechanism to interface a user with the serving IN network to enable the user to review and modify the existing IN services more efficiently and user-friendly.

SUMMARY OF THE INVENTION

Subscription data associated with a particular Intelligent Network (IN) subscriber are retrieved from the Service Management Application System (SMAS) associated with a serving Service Control Point (SCP). A Service Script Logic (SSL) interpreter then analyzes the retrieved subscription data and ascertains the identities of the associated SSLs and the relationship therebetween for a given IN service. A Graphical User Interface (GUI) then displays the relationship or hierarchy of the ascertained SSLs for that service. A service provider may then alter the retrieved subscription data by making relational or hierarchical changes to the displayed graphical representation of the associated SSLs. The interpreter thereafter interprets the graphical changes and changes the retrieved subscription data accordingly to reflect the indicated changes. The changed subscription data are then communicated back to the SMAS. The SMAS then down-loads the changed subscription data to the SSLs residing within the serving SCP to effectuate the changed IN service desired by the service provider.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
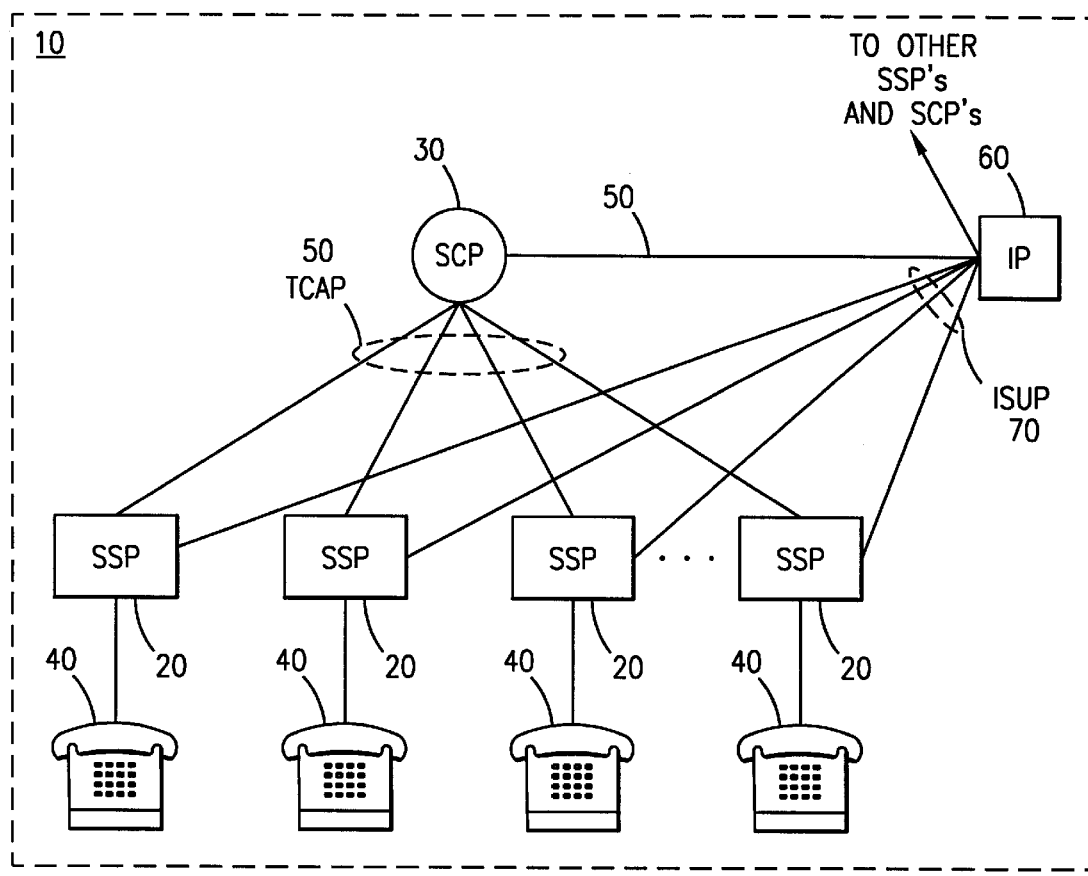
FIG. 1 is a block diagram of an Intelligent Network (IN) telecommunications system providing IN services to subscribers.

FIG. 1 shows an Intelligent Network (IN) 10 providing IN services to subscribers. The basic concept behind IN is to move the intelligence out of each local exchange or Service Switching Points (SSPs) 20 and to centralize the services providing the intelligence in a Service Control Point (SCP) 30. By centralizing the special subscriber services in the SCP 30, a new service can be added in only one place (i.e., the SCP) and provided to all subscribers connected to the multiple SSPs 20. Accordingly, one SSP services multiple telecommunications subscribers or terminals 40, and one SCP services multiple SSPs 20 or local switches. The interfaces between the SSPs 20 are by links 50 utilizing the Signaling System No. 7 (SS7) Transaction Capabilities Application Part (TCAP), or other Signaling Control Connection Part (SCCP) based application layer protocols. More specifically, Intelligent Network Application Protocols (INAP) sit on top of the TCAP protocols to establish a control dialogue between the SSPs 20 and the SCP 30.

Hardware resources required to execute IN services are grouped and located separately from the SSP 20 in an Intelligent Peripheral (IP) 60. The purpose of such a separation is to allow multiple SSPs 20 to share the same resources, to decrease processor load in the SSPs 20 and the SCP 30, and to provide common functionality to all IN services. The resources located in the IP 60 typically include, but are not limited to, announcement machines, speech synthesis, speech recognition, tone generators, voice mail, modems, e-mail, fax, and other operator resources. The SCP 30 and the IP 60 are also connected via another TCAP or INAP based communications link 60. In order to transport voice and data, the connections 70 between the IP 60 and the SSPs 20 are established using Integrated Service Digital Network (ISDN) User Part (ISUP) signals.

Utilizing the above architecture, an incoming or outgoing call connection is initially received by a serving SSP 20 associated with a particular subscriber terminal 40. Since the SSP 20 has no "intelligence" to determine what kind of call treatment should be applied toward the received call connection, the SSP 20 performs a query requesting call treatment instructions to the associated SCP 30 over the connected TCAP link 50. In response to such a query, the SCP 30 retrieves the relevant subscriber data, ascertains the appropriate subscriber service to be provided, and instructs the IP 60 or the associated SSP 20 to effectuate the desired call treatment.

Figure 2:
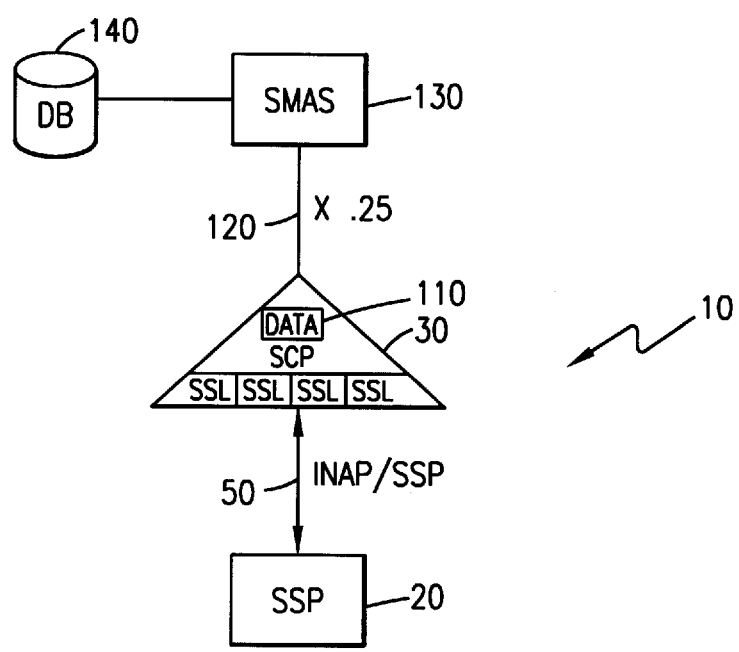
FIG. 2 is a block diagram of an IN system illustrating the association of a Service Management Application System (SMAS), Service Control Point (SCP), and Service Switching Point (SSP)

FIG. 2 is a block diagram of the IN system 10 illustrating the association of a Service Management Application System (SMAS) 130, SCP 30, and SSP 20. A number of available basic building blocks, known as Service Independent blocks (SIBs, not shown in FIG. 2), are utilized by a Service Script Logic (SSL) 100 to effectuate a particular function or procedure within the SCP 30. A specific IN service is then further developed and provided to telecommunications subscribers by utilizing one or more of the SSLs. By utilizing a sequence of SSLs and SIBs, a new IN service can be easily introduced into the existing IN network without developing new instructions or executable codes. The control passes from a first SSL to a second SSL by utilizing network data associated with a particular call connection and/or subscription data 110 associated with an IN subscriber.

In order to install, change, delete, and audit subscription data and associated SSLs within the SCP 30, a application system known as a Service Management Application System (SMAS) 130 is associated with the SCP 30. The SMAS 130 is connected to the SCP 30 via a packet signaling link 120, such as an X.25 or Message Transfer Part (MTP) based signaling link. The SMAS 130 is also associated with a centralized database for storing subscription data associated with its subscribers. Whenever a new IN service needs to be effectuated or subscription data need to be input to the serving SCP, the SMAS 130 communicates the instructions and/or data to the connected SCP over the X.25 communications link 120.

Figure 3:
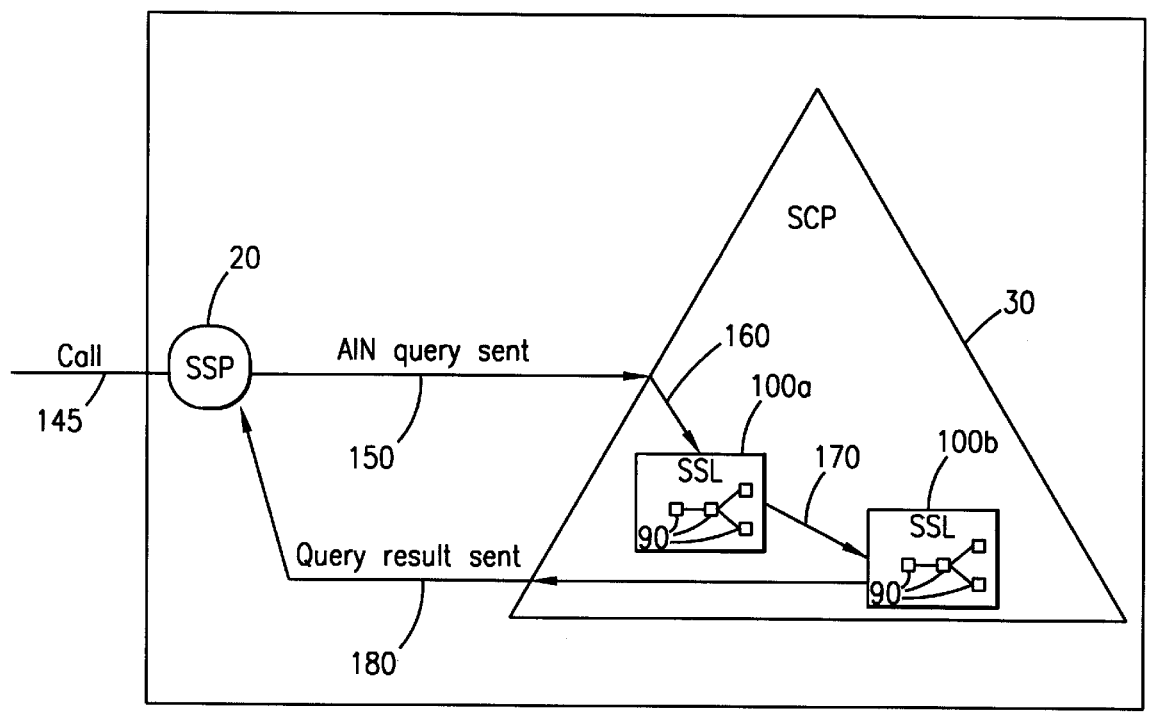
FIG. 3 is a block diagram of an IN system illustrating an SCP interacting with an SSP to provide a particular IN service via a number of Service Script Logics (SSLs)

Reference is now made to FIG. 3 illustrating an SCP 30 interacting with an SSP 20 to provide a particular IN service via a number of SSLs 100. As described above, the SSP 20 initially receives an outgoing or incoming call connection 145. Such a call connection may also include service access, service request, or other non-speech communication from a subscriber terminal. After making a determination that an IN service is associated with the received call connection, the SSP 20 transmits an Intelligent Network (IN) query 150 to the associated SCP 30. An access SSL (not shown in FIG. 3) within the SCP 30 then retrieves the relevant subscription data, such subscription data associated with either the called party subscriber or calling party subscriber, and determines which IN service is be provided for the received incoming call. After selecting an appropriate IN service to be provided, the access SSL then invokes the first SSL 100A correlated with the selected IN service (signal 160). After the execution of the first SSL 100A, the execution control is then transferred (signal 170) over to the next SSL 100B to further effectuate the desired IN service. For exemplary purposes, only two SSLs are shown correlated with a particular IN service in FIG. 3. However, it is to be understood that any number of needed SSLs may be correlated with a particular IN service.

After the execution of all associated SSLs, a query result 180 is transmitted back to the requesting SSP 20 with necessary instructions to enable the SSP 20 to provide the determined call treatment to the received call connection 145. Such an instruction may request the SSP 20 to reroute the received incoming call 145 to a different forward-to-number. It may further instruct the SSP 20 to complete the call connection 145 to a voicemail or announcement machine.

As illustrated in FIG. 3, utilizing the associated subscription data, each SSL only knows the identity of the next SSL to be executed. By recursively executing one SSL and then identifying and invoking the next SSL, all of the associated SSLs for a particular IN service are sequentially executed. However, there is conventionally no mechanism or method for graphically illustrating the relationship or hierarchy of all of the SSLs associated with a particular IN service towards a particular IN subscriber. As a result, a user is unable to easily understand and modify the associated subscription data controlling the execution of those SSLs.

Figure 4:
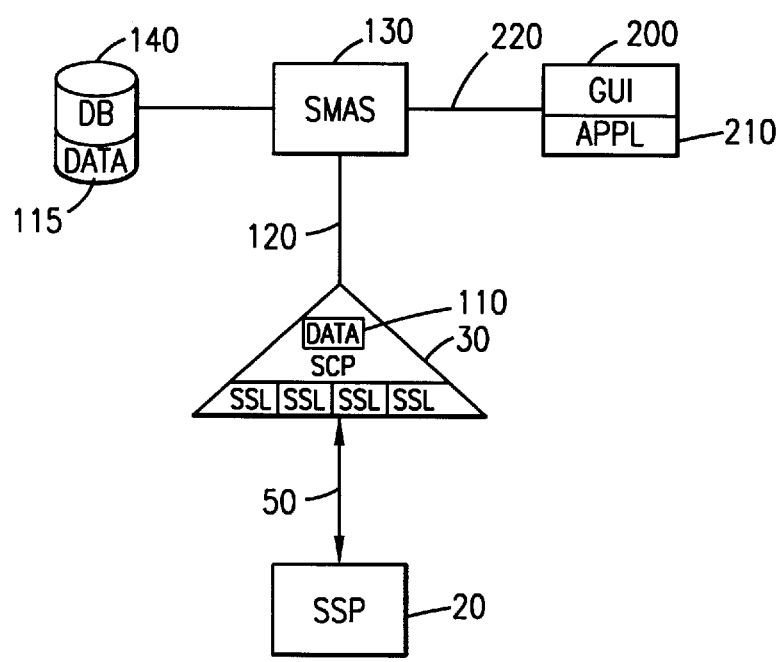
FIG. 4 is a block diagram of an IN system illustrating a Graphical User Interface (GUI) interacting with the SMAS in accordance with the teachings of the present invention.

FIG. 4 is a block diagram of an IN system illustrating a Graphical User Interface (GUI) 200 interacting with the SMAS 130 in accordance with the teachings of the present invention. An application module (APPL) 210 associated with the GUI 200 requests subscription data associated with a particular subscriber from the SMAS 130 over a signaling connection 220. Usually, the GUI 200 sits on top of an UNIX platform and communicates data and signal with the SMAS 130 using an X.25 packets, Transmission Control Protocol/Internet Protocol (TCP/IP) signal, or other packet signaling systems. The database 140 stores data 115 and duplicates the subscription data 110 stored at the SCP 30. The SMAS 130 retrieves and returns the relevant subscription data 115 to the requesting application module 210. The application module 210 then interprets the received subscription data 115 by simulating the executions performed by the SSLs 100 residing within the SCP 30 as fully described in FIG. 3, and identifies the sequence of SSLs associated with the retrieved subscription data for a given IN service. As an illustration, each SSL is comprised of a plurality of SIBs. Each SIB is associated with a particular data type. For example, A-SIB compares the time of the day associated with a particular incoming call connection with a predefined time of the data for routing purposes. Accordingly, when evaluating time of the day data within the retrieved subscription data, the application module 210 knows that A-SIB is associated with this type of data. After identifying the associated SIB(s)(a particular data type may be associated with a number of SIBs), the application module 210 further identifies the SSL(s) using that particular SIB(s) (similarly, a single SIB can be associated with more than one SSL). Simulation of the identified SIB or SSL then indicates which SIB or SSL needs to be invoked next.

Figure 5:
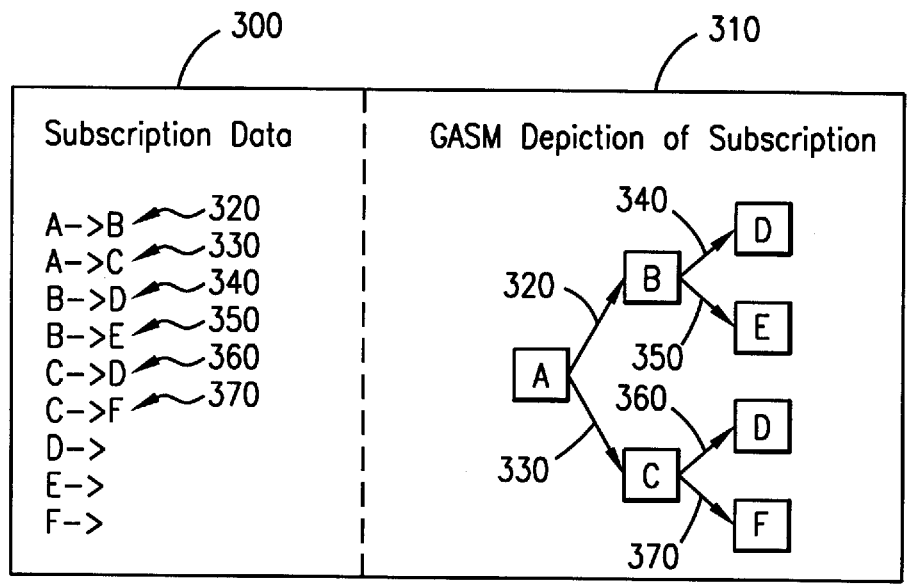
FIG. 5 is a graphical representation illustrating the relationship and hierarchy of associated SSLs for a particular IN service.

Reference is now made to FIG. 5 illustrating the graphical representation depicting the relationship and hierarchy of associated SSLs displayed by the GUI in accordance with the teachings of the present invention. By simulating SSLs stored at the SCP, the application module associated with the GUI is able to identify the particular SSLs (A-SSL, B-SSL, C-SSL, D-SSL, E-SSL, and F-SSL) associated with the retrieved subscription data for a given IN service. Since each SSL only knows the identity of the next SSL, by evaluating all of the retrieved subscription data and SSLs associated with each evaluated data, each SSL is paired up with its associated SSL. As a result, the left-hand side 300 of the displayed window illustrates the notational representation of the identified pairs of SSLs. The first character on the left-hand side of the transitional notation (→) represents an SSL to be executed. The second character on the right-hand side of the same notation represents the next SSL to be executed. If there is no second character on the right-hand side of a notation, it implies that the SSL represented by the left hand side SSL is the end of that sequence or link and a signal with the determined call treatment results needs to be passed back to the requesting SSP.

After all of the SSLs are identified and paired up, a graphical representation illustrating the relationship and hierarchy of all of the SSLs for that subscription data is shown on the right-hand side 310 of the displayed window. Since the A-SSL always calls other SSLs and is never invoked by other SSLs, it is determined that the A-SSL is the very first SSL that needs to executed. By link-listing or tracing the transition from one SSL to another, a full overview of all of the identified SSLs for that subscription data is produced as shown.

For example, the IN subscription data and associated IN service illustrated by the graphical representation 310 routes incoming calls depending on the calling party directory number and the time of the call. Whenever an incoming call connection towards a particular IN directory number is received by the SSP (refer to FIG. 3), the SSP performs a query towards the associated SCP. The SCP retrieves the subscription data associated with the called party directory number and determines which SSLs need to be invoked to provide the desired IN service. The A-SSL is then identified as the first SSL to be executed. The A-SSL ascertains the directory number associated with the calling party subscriber and determines which SSL to execute next. As an illustration, if an incoming call is from a first calling party subscriber, the B-SSL is invoked next (link 320). On the other hand, for all other directory numbers, the C-SSL is invoked (link 330). For example, the B-SSL is invoked for all incoming calls from calling party subscribers with the 214 area code. For the rest of the incoming calls, the C-SSL is instead invoked.

The B-SSL then attempts to determine the time of the day associated with this particular incoming call connection. Depending on the determined time of the day, either the D-SSL (link 340) or the E-SSL (link 350) is invoked next. Similarly, the C-SSL also has the option of either invoking the D-SSL (link 360) or F-SSL (link 370) depending on the time of the day associated with this particular incoming call connection. After the execution of the D-SSL, E-SSL, or F-SSL, the signal with the call routing instruction is returned back to the SSP.

By viewing the overall structure and hierarchy of the associated SSLs for a particular IN service towards a particular subscriber, a service provider is easily able to understand the relationship and functionality of the associated SSLs.

Using the displayed graphical representation of the associated SSLs and their respective relationship, a user is further able to introduce a new or different IN service merely by altering the displayed SSLs and their corresponding relationship. For example, the user no longer wishes to have incoming calls received during 8:00 AM to 12:00 PM to be given a certain call treatment and those calls should be handled in accordance with a regular treatment. The user identifies the B-SSL responsible for making that determination and removes the link 340 associating the D-SSL with the B-SSL. The D-SSL is the SSL for providing the particular call treatment for incoming calls received during 8:00 AM to 12:00 PM. Such an alteration can be made by graphically removing the link 340 to modify the subscriber data used by the selected SSL. Alternatively, the alteration can be made by entering new subscription data to effectively remove the link 340 and the D-SSL. If the changes are directly made to the graphical representation, the application module associated with the GUI then interprets the changes made by the user and modifies the associated subscription data to reflect the indicated changes accordingly. As an illustration, the user selects the link 340 from the window 310 and removes the association of the B-SSL with the D-SSL. Determining that a modification has been made to the existing graphical representation, the application module then identifies the transitional notation 340 corresponding to the removed link 340 from the window 300. The subscription data associated with the identified transitional notation 340 are then accordingly removed.

Figure 6:
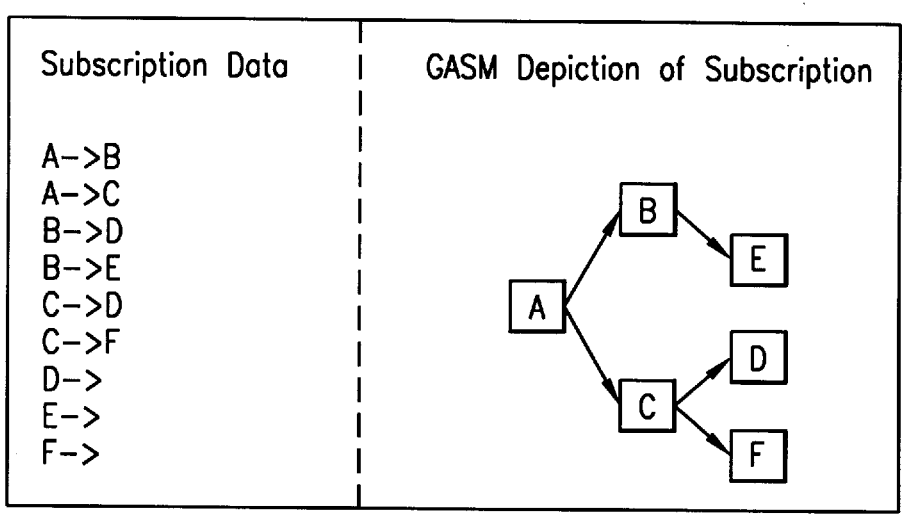
FIG. 6 is a graphical representation illustrating the relationship and hierarchy of associated SSLs after a change has been made to the existing subscription data.

Reference is now made to FIG. 6 illustrating the relationship and hierarchy of associated SSLs after a change has been made to the existing subscription data of FIG. 5. Due to the changes made to the relevant subscription data, the association (link) between the B-SSL to the D-SSL has been removed. Since D-SSL is no longer associated with any other SSLs, it is further removed from the picture.

While the subscription data are removed, added, or altered to change the identity, relationship, functionality and/or hierarchy of the associated SSLs, the application module further performs various error detection functions. These functions are automatically performed to enforce certain pre-defined rules that dictate how individual and sequence of SSLs may be associated. For example, rules dictating that cycles (e.g., A→B→C→A) are not allowed between SSLs may be enforced while the user is altering the subscription data. Other rules or canons, such as a particular SSL needs to be proceeded or followed by a particular SSL, can similarly be enforced. A minimum or maximum depth of associated SSLs (the number of SSLs associated with any one link) for a particular IN service may further be guaranteed.

Furthermore, by interpreting the altered subscription data within the GUI, the user is able to test and confirm the changes made to the functionality, relationship, and/or hierarchy of the associated SSLs without actually executing the same SSLs located at the serving SCP.

Figure 7:
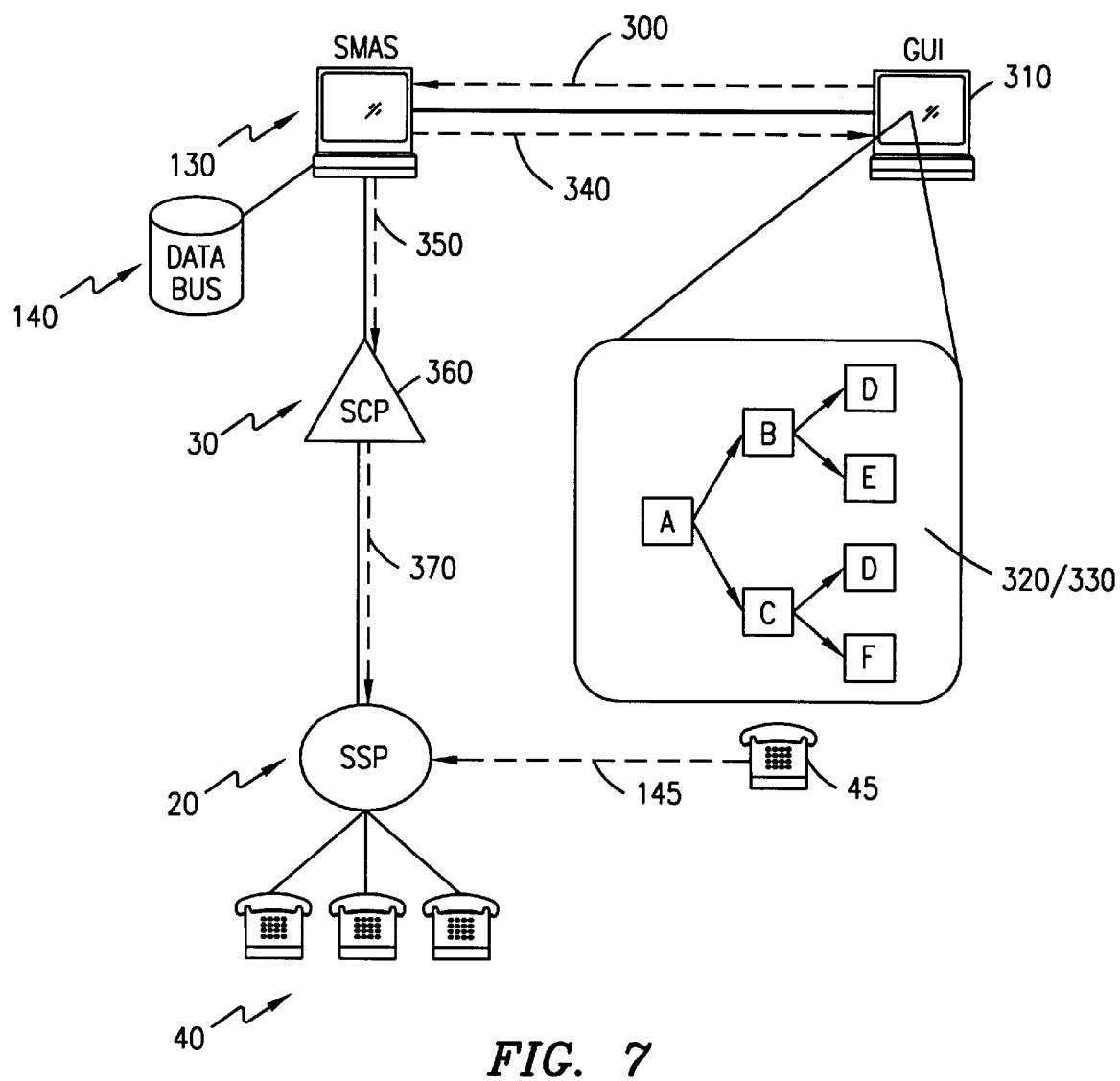
FIG. 7 is a block diagram of an IN system illustrating the association of GUI, SMAS, SCP, and SSP in accordance with the teachings of the present invention.
Figure 8:
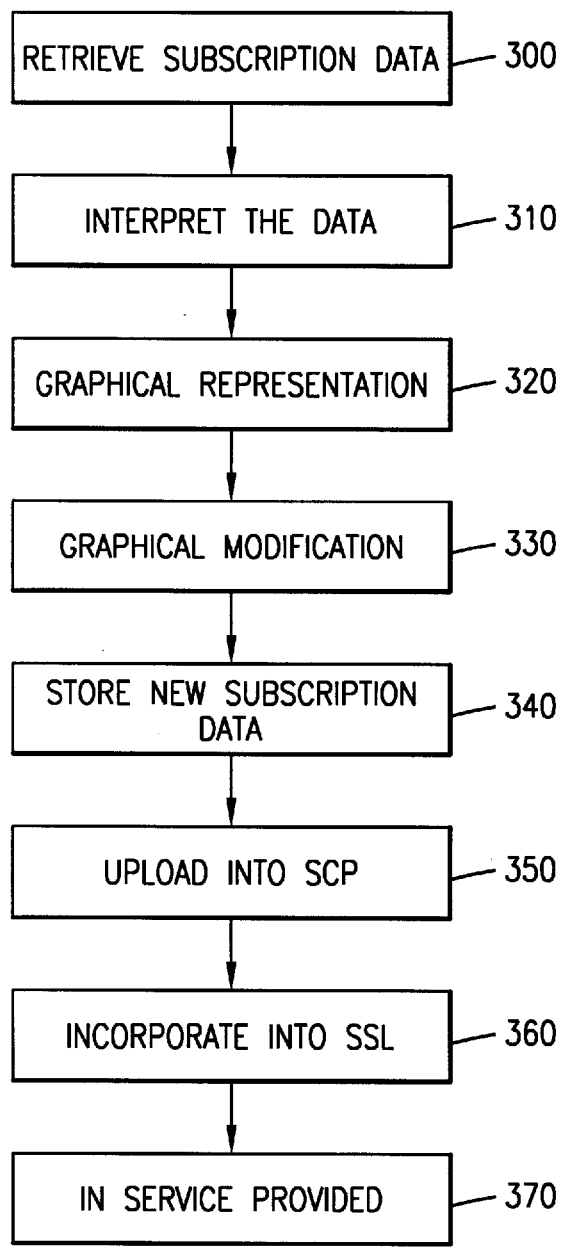
FIG. 8 is a flowchart illustrating the steps performed by an IN system to represent and to modify subscription data associated with a particular IN service in accordance with the teachings of the present invention.

Reference is now made to both FIGS. 7 and 8 illustrating the steps performed by the IN system in accordance with the teachings of the present invention. The application module associated with the GUI requests and receives subscription data from the SMAS 130 and its associated database 140 at step 300. As fully described above, the application module then interprets the retrieved subscription data by simulating the SSLs associated with the serving SCP 30 at step 310. The SSLs associated with the retrieved subscription data are then identified and their relationship ascertained. The identified SSLs and their relationship and hierarchy are then displayed for that subscription data using a graphical representation at step 320. A user is further able to modify the subscription data by altering the graphical representation displayed by the application module at step 330. The application module interprets the changes made to the graphical representation and accordingly modifies the subscription data to reflect the same. The altered subscription data are then communicated back to the SMAS 130 and stored at its associated database 140 at step 340. Since the serving SCP is a real-time telecommunications node, an appropriate time is selected and the altered subscription data are then down-loaded onto the serving SCP 30 at step 350. The new subscription data are then incorporated by the existing SSLs to effectuate a new IN service towards a particular IN subscriber at step 360. As an illustration, in response to an incoming call connection 145 from the calling party subscriber 45, the SSP queries the SCP 30. The SSLs within the SCP 30 utilizes the newly updated subscription data and provides the desired call treatment towards the received call connection at step 370.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for illustrating and manipulating subscription data associated with a subscriber service within an Intelligent Network (IN) telecommunications network, wherein said subscriber service is associated with a plurality of Service Script Logics (SSLs), said plurality of SSLs utilizing said subscription data to effectuate said subscriber service to a particular subscriber, said method comprising the steps of:

a) retrieving subscription data associated with a particular subscriber;
   b) interpreting first of said retrieved subscription data, wherein said step of interpreting includes the step of identifying a SSL associated with said first of said subscription data and simulating the actions performed by said SSL to determine the identity of the next SSL to be invoked;
   c) repeatedly performing step b) until all of said retrieved subscription data have been interpreted and their associated SSLs identified; and
   d) displaying a graphical representation illustrating the relationship and hierarchy of said identified SSLs for effectuating said subscriber service.

2. The method of claim 1 wherein said subscription data are retrieved from a Service Management Application System (SMAS) associated with a Service Control Point (SCP) effectuating said subscriber service.

3. The method claim 1 further including the steps of:
   receiving an indication from a user to modify said relationship or hierarchy of said displayed SSLs to provide a different subscriber service;
   interpreting said indication to change said retrieved subscription data to reflect the modifications made to said relationship or hierarchy of said displayed SSLs; and
   communicating said changed subscription data to said associated SSLs to effectuate said different subscriber service to said subscriber.

4. The method of claim 3 wherein said step of communicating said changed subscription data further comprises the step of storing said changed subscription data to a Service Management Application System (SMAS) associated with a Service Control Point (SCP) effectuating said subscriber service.

5. The method of claim 4 further comprising the step of down-loading said stored subscription data from said SMAS to said SCP over a communication link to effectuate the provision of said different subscriber service by said SCP.

6. The method of claim 3 wherein said step of receiving said indication further comprises the steps of:
   receiving an instruction from said user to select a particular one of said SSLs displayed within said graphical representation;
   displaying subscription data associated with said selected SSL;
   receiving new subscription data replacing said displayed subscription data associated with said selected SSL; and
   re-displaying said graphical representation to illustrate the changes in said relationship and hierarchy of said identified SSLs in accordance with said received new subscription data.

7. A system for illustrating and manipulating subscription data associated with a particular subscriber for a particular Intelligent Network (IN) service within an IN telecommunications network, comprising:
   a Service Control Point (SCP) comprising a plurality of Service Script Logics (SSLs) for effectuating said IN service towards said subscriber using said associated subscription data;
   a management application module associated with said SCP for storing said subscription data and for providing said subscription data to said plurality of SSLs within said SCP for effectuating said IN service; and
   an user interface module associated with said management application module, said user interface module further comprising:
      means for retrieving said subscription data from said management application module;
      means for analyzing said subscription data to determine the relationship and hierarchy of said plurality of SSLs associated with said subscription data; and
      means for displaying said determined relationship and hierarchy of said determined SSLs using a graphical representation to a user.

8. The system of claim 7 further comprises a database wherein said management application module comprises a Service Management Application System (SMAS) connected to said SCP, said SMAS further connected to said database for storing said subscription data.

9. The system of claim 7 wherein said user interface module comprises a Graphical User Interface (GUI) system.

10. The system of claim 7 wherein said user interface module further comprises means for accepting an indication from said user to alter said displayed relationship or hierarchy of said SSLs associated with said subscription data.

11. The system of claim 10 further comprising means for analyzing said altered relationship or hierarchy of said SSLs and for changing said associated subscription data to reflect said alteration.

12. The system of claim 11 wherein said user interface module communicates said changed subscription data to said management application module.

13. The system of claim 12 wherein said management application module further comprises means for communicating said changed subscription data to said plurality of SSLs by down-loading said changed subscription data to said SCP.

14. A method for illustrating and manipulating an Intelligent Network (IN) service being provided within an IN telecommunications network, said IN service associated with a plurality of Service Script Logics (SSLs), each of said plurality of SSLs associated with 'subscription data for executing said SSL's internal instructions and for determining the next SSL associated with said SSL to effectuate said IN service, said method comprising the steps of:

retrieving subscription data associated with a particular subscriber for effectuating a particular IN service;

analyzing said subscription data to determine the identities of said plurality of SSLs associated with said subscription data to effectuate said particular IN service;

determining the execution sequence associated with said determined plurality of SSLs;

displaying the relationship and hierarchy of said determined execution sequence of SSLs using a graphical representation to a user, said graphical representation enabling said user to overview the overall execution sequence of said plurality of SSLs needed for effectuating said IN service to said subscriber.

15. The method of claim 14 further comprising the steps of:

receiving an indication from said user to change said displayed relationship or hierarchy of said plurality of associated SSLs to provide a different IN service;

making changes to said retrieved subscription data to effectuate such changes to said displayed relationship or hierarchy of SSLs; and communicating said changed subscription data to said plurality of SSLs for effectuating the provision of said different IN service.

16. The method of claim 15 wherein said subscription data are retrieved from a Service Management Application System (SMAS) associated with a Service Control Point (SOP) effectuating said subscriber service.

17. The method of claim 16 wherein said step of communicating said changed subscription data to said plurality of SSLs further comprises the step of communicating said changed subscription data to said SMAS.

18. The method of claim 17 wherein said step of communicating said changed subscription data to said plurality of SSLs further comprises the step of down-loading said communicated subscription data from said SMAS to said SCP.

19. The method of claim 14 wherein said step of determining said execution sequence further comprises the step of interpreting first of said retrieved subscription data wherein said step of interpreting includes the step of identifying a first SSL associated with said first of said retrieved subscription data and simulating the actions performed by an SSL associated with said first subscription data to determine the identity of the next SSL to be invoked.

20. The method of claim 19 wherein said step of interpreting is recursively performed for all of said retrieved subscription data to determine the identities of said plurality of SSLs associated with said IN service.

* * * * *

UNITED STATES PATENT AND TRADEMARK OFFICE
CERTIFICATE OF CORRECTION

PATENT NO. : 5,881,144
DATED : March 9, 1999
INVENTOR(S) : Havens

It is certified that error appears in the above-identified patent and that said Letters Patent is hereby corrected as shown below:

[57] Abstract, line 13    After "corresponding"
Delete --is--

Column 9, line 21    Replace "'subscription"
With --subscription--

Column 10, line 16    Replace "(SOP)"
With --(SCP)--

Signed and Sealed this

First Day of May, 2001

Attest:

NICHOLAS P. GODICI

*Attesting Officer*    *Acting Director of the United States Patent and Trademark Office*